United States Patent [19]
Lohr

[11] 3,771,121
[45] Nov. 6, 1973

[54] PRESSURE SENSING APPARATUS
[75] Inventor: Thomas E. Lohr, Warren, Mich.
[73] Assignee: Allied Chemical Corporation, New York, N.Y.
[22] Filed: Aug. 7, 1972
[21] Appl. No.: 278,503

[52] U.S. Cl. .............................. 340/52 R, 340/240
[51] Int. Cl. .......................................... G08b 21/00
[58] Field of Search .......................... 340/52 R, 240

[56] References Cited
UNITED STATES PATENTS
3,686,656  8/1972  Richards ............................ 340/240
3,691,521  9/1972  Schaefer ............................ 340/240

*Primary Examiner*—Thomas B. Habecker
*Attorney*—Jonathan Plaut et al.

[57] ABSTRACT

A pressure sensing means responsive to gas pressure within a gas containing vessel of a motor vehicle's inflatible bag restraint system is connected in parallel with a signal means located within the passenger compartment of the vehicle. The connection is such that the signal means receives and becomes energized with power from an electrical power source when the sensing means shifts from a conductive to a non-conductive mode. Normal gas pressures within the vessel maintain the pressure sensing means in the conductive mode. If gas pressure in the vessel falls below a preselected pressure, the pressure sensing means shifts to its non-conductive mode, whereby the signal means becomes energized and serves to inform passengers of the vehicle that the gas pressure is dangerously low.

5 Claims, 4 Drawing Figures

PATENTED NOV 6 1973 3,771,121
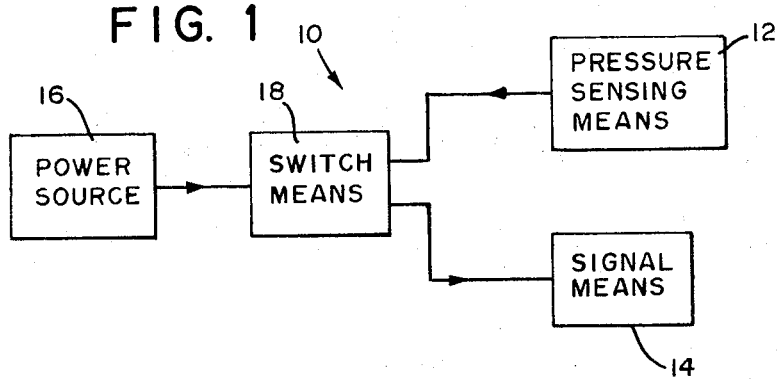
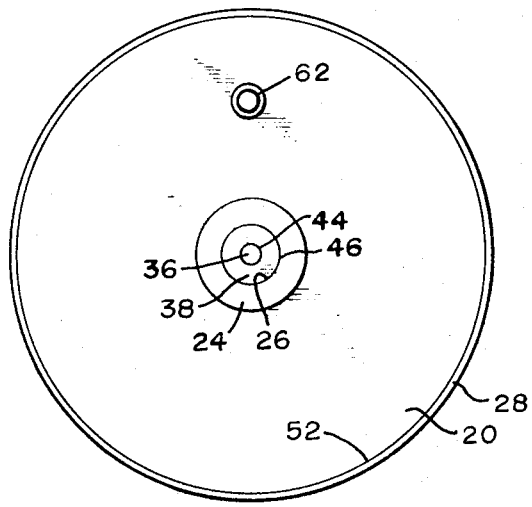
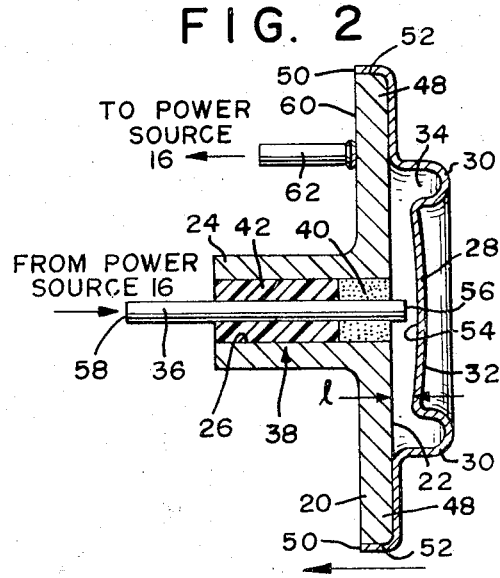
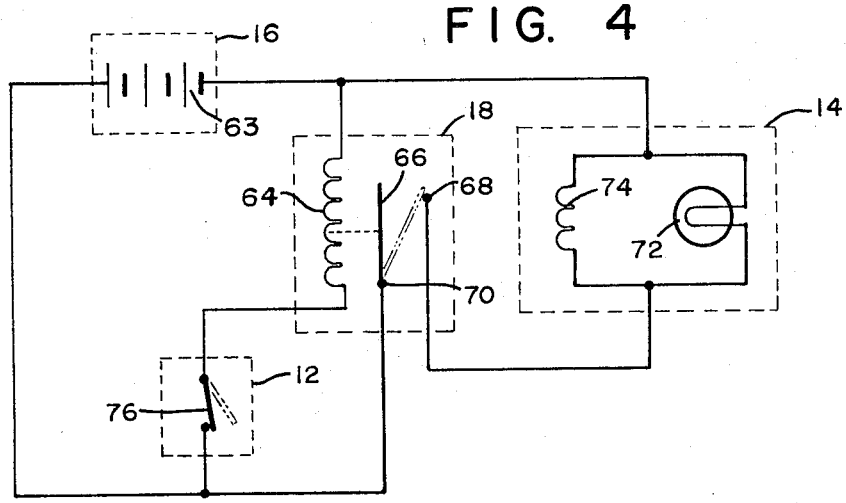

PRESSURE SENSING APPARATUS

BACKGROUND OF THE INVENTION

1. Field of the Invention

This invention relates to apparatus especially adapted for use with motor vehicle passive restraint systems which operate in the event of a collision to deliver gas from a gas source into an inflatable bag, and more particularly to pressure sensitive apparatus for signalling an occupant of the vehicle where pressure within the gas source falls below a preselected pressure.

2. Description of the Prior Art

Inflatable bag restraint systems have been recently developed which should significantly decrease the number of fatalities and serious injuries resulting from motor vehicle accidents. Such systems generally include a source of pressurized gas disposed within a vehicle and apparatus connected to the gas source for creating an outlet therein when the vehicle is involved in a collision. The outlet communicates with an inflatable bag. Gas flows from the gas source through the outlet and into the bag, which is rapidly inflated by the gas. It is obviously of prime importance that passengers of the vehicle be forewarned if the pressure of the stored gas falls below the pressure necessary for proper inflation of the bag. Pressure indicating devices have been employed to inform vehicle passengers when the pressure of the stored gas is dangerously low. Such devices contain complex electrical components and circuits which are expensive and, unless regularly serviced, may become insufficiently reliable in operation when subjected to changing climatic conditions for prolonged periods of time. For this reason pressure indicating devices of the type described generally result in higher purchase and maintenance costs than are considered to be commercially acceptable.

SUMMARY OF THE INVENTION

The present invention provides an inexpensive and highly reliable pressure sensing apparatus for informing vehicle passengers when gas pressure within a gas source falls below a preselected level. A pressure sensing means disposed within a gas containing vessel of the gas source is connected in parallel with a signal means located within the passenger compartment of a vehible in which the apparatus is disposed. The connection is such that the signal means receives and becomes energized with power from an electrical power source when the sensing means shifts from a conductive to a non-conductive mode. Normally, the pressure of gas within the gas containing vessel is about the preselected pressure, with the result that the pressure sensing means is maintained in the conductive mode. If the gas pressure falls below the preselected pressure, the pressure sensing means shifts from the conductive to the nonconductive mode, whereby the signal means becomes energized and serves to inform passengers of the vehicle that the pressure of the gas is dangerously low.

More specifically, the pressure sensing means has a substantially rigid supporting member having inner and outer faces. A pressure responsive electrically conductive diaphragm is provided having a portion thereof in sealing engagement with the supporting member, the remaining portion being spaced from the inner face of the supporting member. The diaphragm and the supporting member define a hollow compartment having an evacuated state. A contact member extends through the supporting member and partially into the hollow compartment. Insulating and sealing means are disposed between the contact member and the supporting member for insulating the contact member from the supporting member and effecting an air tight seal therebetween so as to maintain said hollow compartment in said evacuated state.

The apparatus of this invention has advantageous structural features. Very few parts are required for construction of the pressure sensing means. Each of such parts is easily fabricated and relatively strong. As a result, the pressure sensing means is quickly and easily assembled at minimal cost to form remarkably sturdy unit. The evacuated state of the hollow compartment prevents corrosion of the contact member and eliminates the necessity for employing non-corrosive components, which are usually more expensive. If the sealing means cracks and leaks or if the hollow compartment otherwise loses it evacuated state, then the pressure sensing means shifts from the conductive to the non-conductive mode and the signal means becomes energized. Thus, the apparatus is fail-safe in the most probable failure mode.

BRIEF DESCRIPTION OF THE DRAWINGS

The invention will be more fully understood and further advantages will become apparent when reference is made to the following detailed description and the accompanying drawings in which FIG. 1 is a diagrammatic representation of a preferred form of pressure sensing apparatus for informing vehicle passengers if gas pressure within a gas containing vessel falls below a preselected level;

FIG. 2 is a side elevation, partly in section, of the pressure sensing means of FIG. 1;

FIG. 3 is a plan view of the pressure sensing means of FIGS. 1 and 2; and

FIG. 4 is a schematic electrical diagram of the apparatus of FIG. 1.

DESCRIPTION OF THE PREFERRED EMBODIMENT

Most types of inflatable bag restraint systems conventionally employed in motor vehicles have a gas source provided with a gas containing vessel. As a consequence, the present invention will function with most varieties of apparatus for housing and delivering gas into an inflatable bag. For illustrative purposes, the invention is described in connection with an inflatable bag restraint system disposed within a motor vehicle subject to impact, wherein an inflatable bag is connected to the gas containing vessel of a gas source by means of a valve. Upon collision of the vehicle, an appropriate mechanism opens the valve. Pressurized gas, such as nitrogen, flows from the gas containing vessel into the bag which is inflatably disposed between hard portions of the vehicle and passengers or other mobile objects contained therein. The inflating gas can be supplied from a gas source which employs pressurized gas solely, or pressurized gas in combination with gas developed by combustion of gas generating material. In either of these inflatable restraint systems, the necessity for informing vehicle occupants of dangerously low pressure within the gas containing vessel is readily apparent.

Referring to FIG. 1 of the drawings, the pressure sensing apparatus, shown generally at 10, includes a pressure sensing means 12 connected in parallel with a signal means 14, the connection being such that the signal means receives and becomes energized with power from an electrical power source 16 when the sensing means shifts from a conductive to a non-conductive mode. The pressure sensing means 12 is disposed within the gas containing vessel of a motor vehicle's inflatable bag restraint system (not shown) which operates in the event of a collision to deliver gas from the gas containing vessel into an inflatable bag. Signal means 14 of the audible, visual or combined audible and visual variety can be disposed at any suitable location within the passenger compartment of the vehicle. As long as gas pressure within the gas containing vessel is above the preselected pressure necessary for proper inflation of the bag, the pressure sensing means is maintained in the conductive mode. Switch means 18, connected in series with and between power source 16 and each of pressure sensing means 12 and signal means 14, prevents electrical power from reaching signal means 14 during such time as the pressure sensing means 12 remains in the conductive mode. The switch means 18 preferably includes a relay in series with and between the signal means 14 and the power source 16 and having a mode of conductivity opposite, or reciprocal, to that of the pressure sensing means 12. If the gas pressure falls below the preselected pressure, the pressure sensing means 12 shifts from the conductive to the non-conductive mode, thereby causing switch means 18 to shift from a non-conductive to a conductive mode, whereby electrical power is directed through signal means 14. The signal means 14 becomes energized and serves to inform passengers of the vehicle that the pressure of the gas is dangerously low.

The gas containing vessel has a volume in the range of about 50 to 150 cubic inches, preferably about 100 cubic inches. It can be located behind the dashboard of the motor vehicle or at other suitable locations therewithin. Nitrogen, air or other suitable gas which is not toxic to humans, does not have a deleterious effect on the inflatable bag, and can be stored for prolonged periods without leaking from the gas containing vessel is generally used as the pressurized gas. The pressurized gas is normally contained within the gas containing vessel at a pressure in the range of about 1,000 to 4,000 pounds per square inch, and preferably at about 2,000 pounds per square inch. Gas pressures below a preselected pressure, as in the order of about 500 psi, are insufficient to substantially fill the bag and therefore tend to create a potentially dangerous condition. The pressure sensing apparatus of the present invention serves to warn vehicle passengers when the latter condition exists.

FIG. 2 illustrates the pressure sensing means of FIG. 1 in more detail. The pressure sensing means 12 has a substantially rigid electrically conductive supporting member 20 of brass, copper or other suitable electrically conductive material. Supporting member 20 comprises an inner face 22 and a boss 24 having a centrally located bore 26 extending longitudinally thereof. A pressure responsive electrically conductive diaphragm 28 is provided having a portion thereof in sealing engagement with the supporting member 20 the remaining portion being spaced from the inner face 22 as, for example, by means of a plurality of projecting portions 30 joined to a connecting bow 32.

The diaphragm 28 may be made of copper, brass, stainless steel or other suitable flexible, electrically conductive material and is joined to the supporting member 20 by brazing, fusing, soldering or the like. When thus joined, the diaphragm 28 and the supporting member 20 define a hollow compartment 34, the volume of which can vary from about ¼ to 3 cubic inches, and preferably from about ½ to 2 cubic inches. A contact member 36 made of brass, copper or other suitable conductive material is positioned within the bore 26. The contact member 36 extends through the supporting member 20 and part way into the hollow compartment, as in the order of about 20 to 80 percent, preferably about 40 to 60 percent of the length $l$, thereof. For example, the contact member 36 typically extends for about ¼ inch into a ½ inch long compartment 34.

The pressure sensing means is preferably assembled within a vacuum chamber (not shown) so as to effect within the hollow compartment 34 an evacuated state. An insulating and sealing means, generally indicated at 38 and made of rigid thermoplastic resins such as polyethylene resins, electronic ceramics, glass insulators or other suitable electrical insulating and sealing material is disposed between the contact member 36 and the supporting member 20 for insulating the contact member 36 from the supporting member 20 and effecting an air tight seal therebetween. Due to the provision of such seal, the evacuated state of said hollow compartment 34 is maintained. The insulating and sealing means can be secured to the supporting member 20 and the contact member 36 by means of a suitable adhesive such as mineral filled silicone, mineral filled epoxy or the like, formed in situ therebetween. While the insulating and sealing means 38 can be a single member, a plurality of members is preferably employed to effect the insulating and sealing function. Hence, the insulating and sealing means 38 generally includes a sealing member 40 composed to glass, ceramics or other suitable material and an insulating member 42 composed of such insulating materials as polyethylene resins, polyfluorocarbon resins and the like. The various methods and types of apparatus employed to dispose the insulating and sealing means 38 between the contact member 36 and the supporting member 20 will be well understood by those skilled in the art.

In FIG. 3, there is illustrated a plan view of the pressure sensing means of FIGS. 1 and 2. When disposed between the contact member 36 and boss 24 of the supporting member 20, the insulating and sealing means 38 has a substantially annular configuration wherein outer surface portion 44 and inner surface portion 46 thereof are substantially circular in shape. Other configurations of the insulating and sealing means, including a ring-shaped structure having polygonal outer and inner surface portions 44 and 46 can also be used. Flanged portion 48 of supporting member 20 has, in turn, a substantially annular configuration when it is disposed, as shown in FIG. 2, between the insulating and sealing means 38 and attaching ends 50 of diaphragm 28. Other configurations of the flanged portion 48, including a ring-shaped structure wherein surface 52 is polygonal can also be used. The form of the flanged portion 48 and of the insulating and sealing means 38 shown in FIG. 3 is intended to be illustrative and should not be interpreted to limit the invention to the particular configuration disclosed. Accordingly, the term "substantially annular configuration" as used in the specification and claims with reference to each of the insulating and sealing means 38 and the flanged portion 48 is intended to include, as well, configurations of the type discussed in this paragraph.

FIGS. 2 and 3 collectively illustrate the pressure sensing means 12 in its assembled form. End 58 of contact member 36 is electrically connected in series with the positive terminal of power source 16. Hind face 60 of the flanged portion 48 of base 20 is electrically connected in series with and between diaphragm 28 and power source 16 by a conducting means 62 soldered or otherwise electrically connected thereto. Contact head 56 of contact member 36 and diaphragm 28 coact to selectively transmit electric power through the pressure sensing means 12. The diaphragm 28 has an inner surface 54 adapted for movement relative to the contact head 56. Forces resulting from gas pressures in excess of the preselected pressure move the diaphragm 28 in the direction of the arrow until the inner surface 54 thereof is brought into continuous contact with contact head 56 of contact member 36. So long as the pressure sensing means 12 is subjected to such forces, an electrical current from power source 16 is transmitted therethrough. If the gas pressure falls below the preselected pressure, the magnitude of the resulting forces is insufficient to hold the inner surface 54 of diaphragm 28 in contact with contact head 56. The natural resiliency of the diaphragm causes it to move against the direction of the arrow, thereby terminating electrical communication across the pressure sensing means 12.

In FIG. 4 there is shown, schematically, an electrical diagram of one form of the pressure sensing apparatus 10. Other forms can also be used. The pressure sensing means 12, schematically shown as switch 76, is connected in parallel with the signal means 14 and coupled to the power source 16 through the switch means 18. Such pressure sensing means has a conductive and a non-conductive mode and is responsive to gas pressure within a gas containing vessel of an inflatable bag restraint system (not shown). Power source 16 may be a primary of storage battery 63 having an electrical potential of about 12 volts and typically comprises the storage battery of a vehicle in which the apparatus 10 is disposed. Signal means 14 contains in parallel the combination of a lamp 72 located in the dashboard area so as to be readily visible to the driver, and an audio alarm 74 which may be a buzzer, tone generator or the like. The switch means 18 comprises a coil 64 connected in series with and between power source 16 and pressure sensing means 12 and a relay 66 in series with and between signal means 14 and power source 16, the relay being moved from a closed position to an open position upon application of power through the coil 64. When thus connected the switch means 18 and the pressure sensing means 12 have opposite, or reciprocal, modes of conductivity. Moreover, with such connection the switch means 18 is responsive to the mode of conductivity of the pressure sensing means 12, whereby the switch means 18 selectively directs electrical power to the signal means 14. If the relay 66 is in the closed position, terminals 68 and 70 are placed in electrical communication with power source 16, with the result that the signal means 14 becomes energized. This condition can only exist when electrical communication across the pressure sensing means 12 has been terminated. Normally, the pressure sensing means 12 is subjected to pressure above the preselected pressure and is held by forces resulting therefrom in a closed position. The latter condition causes application of power through the coil 64. As a result, relay 66 remains open to prevent energization of the signal means 14.

The pressure sensing apparatus 10 which has been disclosed herein can, of course, be modified in numerous ways without departing from the scope of the invention. An ignition switch can be connected in series with and between the battery 63 and each of coil 64 and signal means 14. This modification advantageously prevents loss of power from battery 63 during such time as the ignition switch is open. Lamp 72 may be equipped with a red lens or include a flusher circuit for increased visability. Such modifications are intended to fall within the scope of the present invention.

In operation, the pressure sensing means 12 is disposed within the gas containing vessel of a motor vehicle's inflatable bag restraint system (not shown). Forces resulting from gas pressures above the preselected pressure hold inner surface 54 of diaphragm 28 in continuous contact with contact head 56. Power is thus applied from battery 63 through coil 64, and relay 66 remains open to prevent energization of signal means 14. If the gas pressure falls below the preselected pressure, the contact between inner surface 54 and contact head 56 ceases, thereby terminating electrical communication across the pressure sensing means 12 and application of power through coil 64. Relay 66 moves to the closed position, and terminals 68 and 70 are thereby placed in electrical communication with battery 63. As a result, the signal means becomes energized and serves to inform occupants of the vehicle that gas pressure within the gas containing vessel is dangerously low.

Having thus described in the invention in rather full detail, it will be understood that these details need not be strictly adhered to but that various changes and modifications may suggest themselves to one skilled in the art, all falling within the scope of the invention as defined by the subjoined claims.

I claim:

1. Pressure sensing apparatus adapted for use with an inflatable bag restraint system having a gas containing vessel disposed within a motor vehicle, comprising:
   a. a power source for supplying electrical power to the apparatus;
   b. signal means in series with said power source for signalling occupants of the vehicle upon receipt of said electrical power;
   c. pressure sensing means in series with said power source and in parallel with said signal means, said pressure sensing means having a conductive and a non-conductive mode and being responsive to gas pressure within said gas containing vessel, and including:
      1. a substantially rigid, electrically conductive supporting member having inner and outer faces,
      2. a pressure responsive, electrically conductive diaphragm having a portion in sealing engagement with said supporting member and the remaining portion spaced from said inner face thereof, said diaphragm and said inner face defining a hollow compartment having an evacuated state;
      3. a contact member extending through said supporting member and partially into said hollow compartment;

4. insulating and sealing means disposed between said contact member and said supporting member for insulating said contact member from said supporting member and effecting an air tight seal therebetween so as to maintain said hollow compartment in said evacuated state; and d. switch means in series with said signal means and responsive to the mode of said pressure sensing means for selectively directing electrical power to said signal means, said switch means and said pressure sensing means having reciprocal modes of conductivity.

2. Pressure sensing apparatus as recited in claim 1 wherein said contact member has a contact head and said diaphragm has an inner surface adapted for movement relative to said contact head, whereby said inner surface is held in contact with said contact head by forces resulting from gas pressures above a preselected pressure.

3. Pressure sensing apparatus as recited in claim 2 wherein said preselected pressure ranges from about 1,000 to 4,000 pounds per square inch.

4. Pressure sensing apparatus as recited in claim 1 wherein said signal means includes in parallel the combination of a lamp and an audible alarm.

5. Pressure sensing apparatus as recited in claim 1 wherein said switch means is in the form of a reed relay comprising a coil in series with and between said power source and said pressure sensing means and a relay in series with and between said signal means and said power source, said relay being moved from a closed position to an open position upon application of power through said coil.

* * * * *